Patented Dec. 14, 1948

2,456,515

UNITED STATES PATENT OFFICE 2,456,515

ANIMAL FEED COMPOSITION

Jonas Kamlet, New York, N. Y., and Ralph P. Reece, Highland Park, N. J., assignors to Thiokol Corporation, Trenton, N. J., a corporation of Delaware No Drawing. Application January 6, 1948, Serial No. 816

2 Claims. (Cl. 99—2)

This invention relates to animal feeding, and animal feeds containing a chemical compound which causes a desired result to be obtained such as increase in weight or improvement in carcass grade with the consumption of decreased or subnormal proportions of feed. Thereby the efficiency of the feed in producing the desired result is increased and corresponding economies are realized.

To produce the desired effect it is necessary for the animals to consume the active ingredient in amounts and at a rate that will produce in the blood stream a sufficient concentration of that ingredient to produce a desired inhibition of thyroid function. It is also of vital importance that such minimum level or concentration of active ingredient should not cause a toxic action because in that case the animal goes "off feed" and the desired weight increase is not obtained for that reason.

One object of the invention is to produce an animal feed composition containing a thyroid inhibiting ingredient which can be used in amounts necessary to produce the said inhibition without causing a toxic action.

Another object is to produce a general-purpose feed composition which can be fed to various species of animals, e. g., cattle, swine and poultry to obtain the desired results.

Substances such as thiourea and thiouracil will produce an inhibition of the thyroid function but that effect is attended with a toxic action on certain species of animals, e. g., cattle and those substances are not therefore capable of general use. 4-methyl, 2-thiouracil (also designated 6-methyl, 2-mercapto, 4-hydroxypyrimidine) has been found to have advantages including the unexpected and valuable property of producing the desired inhibition of thyroid function without causing a toxic effect.

To illustrate the advantages of 4-methyl, 2-thiouracil over substances such as thiouracil and thiourea, it may be stated that, in the case of dairy cows about 20 grams of 4-methyl, 2-thiouracil per day is necessary to get the desired effect, i. e., inhibition of thyroid function and it is possible to get the desired effect because that amount is tolerated by the animal. In the case of substances such as thiourea and thiouracil it is not possible to get the desired effect, with the same species of animal, because the minimum critical amount is not tolerated as evidenced by the fact that the animal goes "off feed."

To further illustrate the advantages of 4-methyl, 2-thiouracil over thiouracil when incorporated into feeds for swine, it has been found that whereas 0.25 per cent by weight of thiouracil is required in the feed to effect an economy of 20 per cent in feed consumption, as little as 0.10 per cent by weight of 4-methyl, 2-thiouracil will effect an economy of 36 per cent in feed consumption as evidenced by the data shown in the following Tables I and II.

Table I.—Influence of thiouracil on weight gains and feed consumption in swine

| Group No. | Thiouracil Treatment [1] | No. of Animals | Initial weight | Final weight | Gain in weight 45 days | Total feed consumed | Feed consumed per 100 lbs. gain | Average daily gain |
|---|---|---|---|---|---|---|---|---|
| | | | Pounds | Pounds | Pounds | Pounds | Pounds | Pounds |
| 1 | Control | 4 | 930 | 1,130 | 200 | 1,640 | 820 | 1.11 |
| 2 | 0.15 | 4 | 930 | 1,150 | 220 | 1,664 | 756 | 1.22 |
| 3 | 0.20 | 4 | 850 | 1,075 | 225 | 1,628 | 724 | 1.25 |
| 4 | 0.25 | 4 | 840 | 1,090 | 250 | 1,628 | 651 | 1.39 |

[1] Percentage of thiouracil in feed.

Table II.—Influence of 4-methyl, 2-thiouracil on weight gains and feed consumption in swine

| Group No. | 4-methyl 2-thiouracil treatment [1] | No. of Animals | Initial weight | Final weight | Gain in weight 40 days | Total feed consumed | Feed consumed per 100 lbs. gain | Average daily gain |
|---|---|---|---|---|---|---|---|---|
| | | | Pounds | Pounds | Pounds | Pounds | Pounds | Pounds |
| 1 | Control | 6 | 970 | 1,280 | 310 | 2,300 | 741.9 | 1.29 |
| 2 | 0.05 | 6 | 900 | 1,220 | 320 | 1,700 | 531.3 | 1.33 |
| 3 | 0.10 | 6 | 880 | 1,240 | 360 | 1,700 | 472.2 | 1.50 |
| 4 | 0.25 | 6 | 1,010 | 1,320 | 310 | 2,000 | 645.1 | 1.29 |

[1] Percentage of 4-methyl, 2-thiouracil in feed.

In accordance with the invention a feed composition is made containing for example from 0.05 to 2.0 per cent by weight of 4-methyl, 2-thiouracil mixed with and uniformly dispersed throughout a mass of feed material which may consist of any suitable animal feed, preferably in ground or comminuted condition. Such feed materials are of diverse compositions. However they are, per se, well known. They contain components such as ground cereal grains, animal or vegetable oils, fats, proteins, etc., and are generally in a rather finely divided or comminuted form e. g. meal. While it is possible to make such compositions by directly incorporating 4-methyl, 2-thiouracil with the feed, it is preferred in accordance with the present invention first to make a concentrate by incorporating relatively large proportions of 4-methyl, 2-thiouracil with a feed. The concentrate may be used by diluting it with a feed substance to produce a feed product having concentrations of 4-methyl, 2-thiouracil e. g. within the above mentioned range of about 0.05 to 2.0 per cent by weight.

The principles of the invention will be defined in the claims and further described by reference to the following examples, it being understood that the examples are illustrative and that many variants may be made within the substance of the invention and the scope of the claims.

EXAMPLE 1

Feed A

| | Pounds |
|---|---|
| Ground corn | 400 |
| Ground oats | 400 |
| Wheat bran | 300 |
| Linseed oil meal | 100 |

Feed B

| | Pounds |
|---|---|
| Ground barley | 400 |
| Ground oats | 400 |
| Wheat bran | 300 |
| Linseed oil meal | 100 |

Feed C

| | Pounds |
|---|---|
| Ground corn | 400 |
| Ground barley | 400 |
| Linseed oil meal | 100 |

Feed D

| | Pounds |
|---|---|
| Ground corn | 800 |
| Wheat bran | 100 |
| Linseed oil meal | 100 |

With each of the above feed compositions there is incorporated from 0.05 to 2.0 per cent by weight of 4-methyl, 2-thiouracil.

EXAMPLE 2

Basic feed composition containing protein 18% by weight (minimum), fat 4% by weight (minimum) and fibre 10% by weight (maximum) and composed of the following ingredients:

Corn gluten feed
Wheat bran
Ground oats
Ground barley
41% protein soybean oil meal
34% O. P. linseed meal
Cocoanut oil meal
Babassu oil meal
Tucum oil meal
Brewers' dried grains
Cane molasses
¾% dicalcium phosphate
¼% ground limestone
1% iodized salt With the feed composition there is incorporated from 0.05 to 2.0 per cent by weight of 4-methyl, 2-thiouracil.

The 4-methyl, 2-thiouracil can be incorporated with the above feeds or other feeds in any desired manner, e. g. by hand or machine mixing, or by soaking or spraying the feed with a solution or suspension of the 4-methyl, 2-thiouracil. However it is preferred to prepare a concentrate so that such concentrate can be mixed with feeds. Such concentrate is advantageous for a number of reasons. Such concentrate can be mixed with various feeds to adjust the ultimate concentration in the feed to the requirements of the particular species of animal. Moreover, the use of such concentrate makes it possible to get a more uniform dispersion of the active ingredient in the feed. It is often necessary or desirable to use very simple tools e. g. shovels to perform the mixing. It is also desirable or necessary to secure uniform dispersion of the active ingredient. Both objects are facilitated by the use of a concentrate. Such concentrate is illustrated by the following:

EXAMPLE 3

| | Per cent |
|---|---|
| Corn meal | 70–90 |
| 4-methyl, 2-thiouracil | 10 to 30 |

What is claimed is:

1. An animal feed containing 0.05 to 2.0 per cent by weight of 4-methyl, 2-thiouracil.

2. An animal feed concentrate containing 10 to 30 per cent by weight of 4-methyl, 2-thiouracil, adapted to be diluted with a feed substance to produce a feed having the composition set forth in claim 1.

JONAS KAMLET.
RALPH P. REECE.

REFERENCES CITED

The following references are of record in the file of this patent:

UNITED STATES PATENTS

| Number | Name | Date |
|---|---|---|
| 2,438,353 | Turner et al | Mar. 23, 1948 |